US009819601B2

(12) United States Patent
Meghani et al.

(10) Patent No.: US 9,819,601 B2
(45) Date of Patent: Nov. 14, 2017

(54) SYSTEMS AND METHODS OF MODIFYING DATA PACKETS USED IN IP TELEPHONY COMMUNICATIONS

(71) Applicant: VONAGE AMERICA INC., Holmdel, NJ (US)

(72) Inventors: Jaya Meghani, Old Bridge, NJ (US); Baruch Sterman, Efrat (IL); Arthur Wilton, East Windsor, NJ (US)

(73) Assignee: VONAGE AMERICA INC., Holmdel, NJ (US)

( * ) Notice: Subject to any disclaimer, the term of this patent is extended or adjusted under 35 U.S.C. 154(b) by 784 days.

(21) Appl. No.: 13/728,265

(22) Filed: Dec. 27, 2012

(65) Prior Publication Data

US 2016/0112338 A1 Apr. 21, 2016

(51) Int. Cl.

| | |
|---|---|
| ***H04L 12/805*** | (2013.01) |
| ***H04L 29/06*** | (2006.01) |
| ***H04L 29/08*** | (2006.01) |

(52) U.S. Cl.
CPC ........ *H04L 47/365* (2013.01); *H04L 67/2828* (2013.01); *H04L 69/166* (2013.01); *H04L 63/0428* (2013.01)

(58) Field of Classification Search
CPC ..................................................... H04L 47/365
USPC ...................... 370/230.1, 470–472, 476–477
See application file for complete search history.

(56) References Cited

U.S. PATENT DOCUMENTS

| | | | |
|---|---|---|---|
| 5,771,239 A | 6/1998 | Moroney et al. | |
| 6,856,613 B1 | 2/2005 | Murphy | |
| 2004/0028231 A1 | 2/2004 | Sako | |
| 2004/0181811 A1 | 9/2004 | Rakib | |
| 2005/0081027 A1 | 4/2005 | Thornton et al. | |
| 2005/0192904 A1 | 9/2005 | Candelore | |
| 2007/0160208 A1 | 7/2007 | MacLean et al. | |
| 2007/0217424 A1* | 9/2007 | Kim et al. | 370/392 |
| 2008/0235522 A1 | 9/2008 | Suzuki et al. | |
| 2009/0060184 A1 | 3/2009 | Alten | |
| 2009/0327691 A1 | 12/2009 | Kishore et al. | |
| 2009/0327842 A1* | 12/2009 | Liu et al. | 714/776 |
| 2010/0008506 A1 | 1/2010 | Park et al. | |
| 2010/0027795 A1 | 2/2010 | Wajs et al. | |
| 2011/0044326 A1 | 2/2011 | Tasker et al. | |
| 2011/0194692 A1* | 8/2011 | Carpenter et al. | 380/255 |
| 2011/0299685 A1 | 12/2011 | Hall | |

(Continued)

OTHER PUBLICATIONS

Office Action dated Oct. 8, 2014 in U.S. Appl. No. 13/728,143.

(Continued)

*Primary Examiner* — Redentor Pasia
(74) *Attorney, Agent, or Firm* — Nixon & Vanderhye P.C.; Joseph Pagnotta

(57) ABSTRACT

Systems and methods performed by an IP telephony device or an element of an IP telephony system mask the data contained in data packets bearing the media of an IP telephony communication to prevent an Internet service provider from identifying the data packets as carrying the media of an IP telephony communication. The systems and methods can also modify the size of data packets and/or modify the data transfer rate of a stream of data packets bearing the media of an IP telephony communication to prevent an Internet service provider from identifying the stream of data packets as bearing the media of an IP telephony communication.

16 Claims, 10 Drawing Sheets

START
RECEIVE DATA PACKET — S702
MODIFY SIZE OF DATA PACKET BASED ON KEY — S704
SEND MODIFIED DATA PACKET — S706
S708
CALL TERMINATED?
NO
YES
END

(56) References Cited

U.S. PATENT DOCUMENTS

| | | | |
|---|---|---|---|
| 2012/0002812 | A1 | 1/2012 | Bell et al. |
| 2012/0140928 | A1 | 6/2012 | Messerges et al. |
| 2012/0250863 | A1 | 10/2012 | Bukshpun et al. |
| 2014/0115325 | A1 | 4/2014 | Detienne et al. |

OTHER PUBLICATIONS

International Search Report Issued in PCT/US2013/078012 dated Apr. 22, 2014.
Written Opinion Issued in PCT/US2013/078012 dated Apr. 22, 2014.
Hernacki B et al., "An Overview of Network Evasion Methods", Information Security Technical Report, Elsevier Advanced Technology, Amsterdam, NL, vol. 10, No. 3, Jan. 1, 2005, pp. 140-149.
Haas, H., "Introduction Ambiguities IP Fragments TCP Attacks IDS Insertion and Evasion Techniques Introduction Ambiguities IP Fragments TCP Attacks", Mar. 3, 2015, whole document.
Okabe T et al., "Statistical Traffic Identification Method Based on Flow-Level Behavior for Fair VOIP Service", VOIP Management and Security, 2006, 1st IEEE Workshop on Apr. 3, 2006, Piscataway, NJ, USA, IEEE, Apr. 3, 2006; pp. 33-38 and pp. 4, paragraph 2-p. 7.
Allen, D., "On the Far Side: NAT and Session Border Controllers NAT Plays a Major, If Low-Profile, Role in Bringing VOIP Security to Firewalls", Network Magazine, CMP Media, New York, NY, US; vol. 18, No. 4, Apr. 1, 2003; pp. 30-32, 34 and pp. 1, paragraph VOIP: The Wild Card—p. 3.
U.S. Appl. No. 13/728,143, filed Dec. 27, 2012, entitled "Systems and Methods of Modifying Data Packets Used in IP Telephony Communications".
U.S. Appl. No. 13/728,441, filed Dec. 27, 2012, entitled "Systems and Methods of Modifying Data Packets Used in IP Telephony Communications".
U.S. Office Action dated Aug. 29, 2014 in U.S. Appl. No. 13/728,441.
U.S. Final Office Action dated Jul. 16, 2015 in U.S. Appl. No. 13/728,143.

* cited by examiner

SYSTEMS AND METHODS OF MODIFYING DATA PACKETS USED IN IP TELEPHONY COMMUNICATIONS

BACKGROUND OF THE INVENTION

The invention is related to Internet Protocol (IP) telephony systems. More specifically, the invention is related to systems and methods for modifying data packets that carry the media of IP telephony communications to prevent an Internet Service Provider (ISP) from throttling, blocking or otherwise interfering with transmission of the data packets. The same or similar techniques could be used to prevent interference with data packets that are specifically formatted for other purposes.

Existing IP telephony systems allow users to place and receive telephone calls and to send and/or receive other types of communications, such as text messages, SMS messages, MMS messages and the like. The communications are transmitted, at least in part, by data packets that traverse a private and/or public data network.

When an IP telephony communication is to be established with an IP telephony device, a stream of data packets bearing setup signaling is first communicated with the IP telephony device. Once the setup signaling is complete, data packets bearing the media of the telephony communication pass back and forth to the IP telephony device. The data packets that bear the media of the telephony communication may pass over a different path than the data packets bearing the setup signaling.

Data packets bearing the media of a telephony communication frequently traverse public data networks, such as the Internet. This typically means that an Internet service provider (ISP) is responsible for transmitting the data packets along at least a part of the path to and from the IP telephony device.

Because IP telephony communications can require significant amounts of bandwidth, some ISPs attempt to identify and then throttle data streams which carry IP telephony communications. Doing so can help them to conserve their available bandwidth to ensure that all customers receive service. However, when the data packets bearing the media of an IP telephony communication are throttled, it can adversely impact the quality of the communication. In some instances, throttling the data stream bearing the media of an IP telephony communication can cause the communication to fail completely.

ISPs can identify a stream of data packets bearing the media of an IP telephony communication in multiple different ways. In some instances, the ISP can perform an inspection of the contents of the data packets to determine if the data packets conform to a typical format used for IP telephony communications. This can include examining the data in the header of a data packet to see if the header is formatted like a typical data packet used to carry the media of an IP telephony communication.

In other instances, an ISP can determine the originating and/or destination IP addresses of data packets, and those IP addresses can be compared to the IP addresses of known IP telephony system assets. If a stream of data packets is being sent to or being received from a server or gateway maintained by an IP telephony system, the ISP can identify the stream of data packets as likely carrying the media of an IP telephony communication.

An ISP can also check a stream of data packets to determine if the stream has characteristics which conform to typical IP telephony communications. This can include examining the size of the individual data packets to determine if the data packets have a size that is typically used to carry the media of an IP telephony communication. This can also include examining the data transfer rate of the stream to determine if the data transfer rate appears to conform to a typical standard used for the media of IP telephony communications. Other similar profiling techniques can also be used to identify a stream of data packets as potentially carrying the media of an IP telephony communication.

What is needed are systems and methods that prevent an ISP from identifying a stream of data packets as potentially carrying the media of an IP telephony communication so that the ISP cannot throttle such data streams. Preventing the ISPs from throttling data streams carrying the media of IP telephony communications helps to ensure that the communications will not fail, and helps to ensure that the quality of those communications will remain high.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
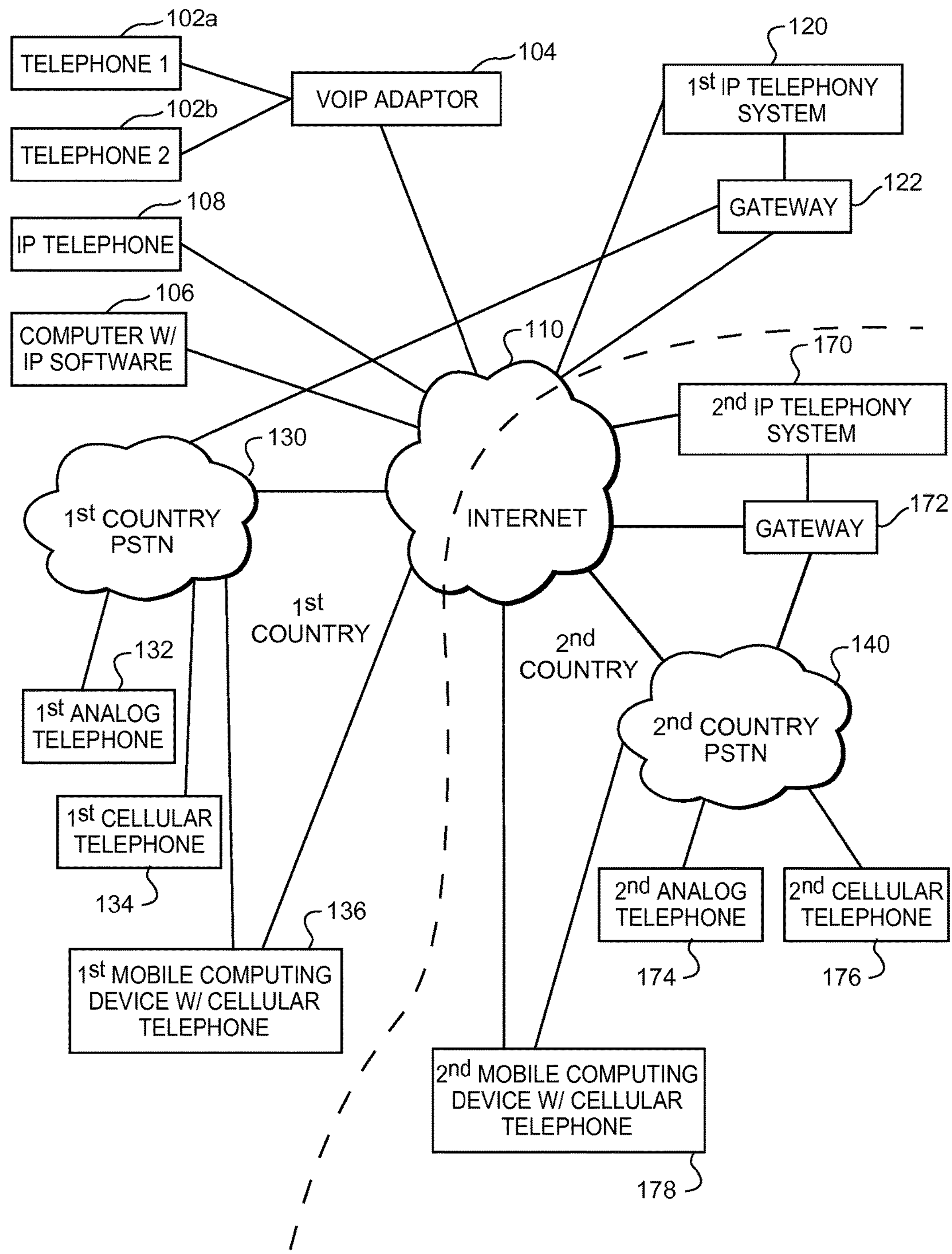
FIG. 1 is a diagram of a communications environment including various elements which are associated with an Internet protocol (IP) telephony system.

As illustrated in FIG. 1, a communications environment is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a first publicly switched telephone network (PSTN) 130 and a second PSTN 140 via one or more gateways 122.

The gateway 122 allows users and devices that are connected to the first and second PSTNs 130, 140 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102*a* which is connected to the Internet 110 via a telephone adapter 104. The telephone adapter 104 converts analog signals from the telephone 102*a* into data signals that pass over the Internet 110, and vice versa. Also, as illustrated in FIG. 1, multiple analog telephone devices 102*a* and 102*b* could all be coupled to the same telephone adaptor 104. Analog telephone devices include, but are not limited to, standard telephones and document imaging devices such as facsimile machines. A configuration using a telephone adapter 104 is common where all of the analog telephone devices 102*a*, 102*b* are located in a residence or business, and all of the telephone devices are connected to the same telephone adapter. With this configuration, all of the analog telephone devices 102*a*, 102*b* share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephone capabilities could also be used to place telephone calls to customers of the IP telephony system. The first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170.

The second IP telephony system could also interact with customers of a second PSTN 140 via a gateway 172. The second PSTN 140 may be connected to a second analog telephone 174, a second cellular telephone 176 and a second mobile computing device 178.

In the following description, we will assume that the first IP telephony system 120, the first PSTN 130, the IP telephone 108, the VOIP adaptor 104, the first analog telephone 132, the first cellular telephone 134 and the first mobile computing device 136 are all located in a first country. Also, the second IP telephony system 170, the second PSTN 140, the second analog telephone 174, the second cellular telephone 176 and the second mobile computing device 178 are all located in a second country.

Figure 2:
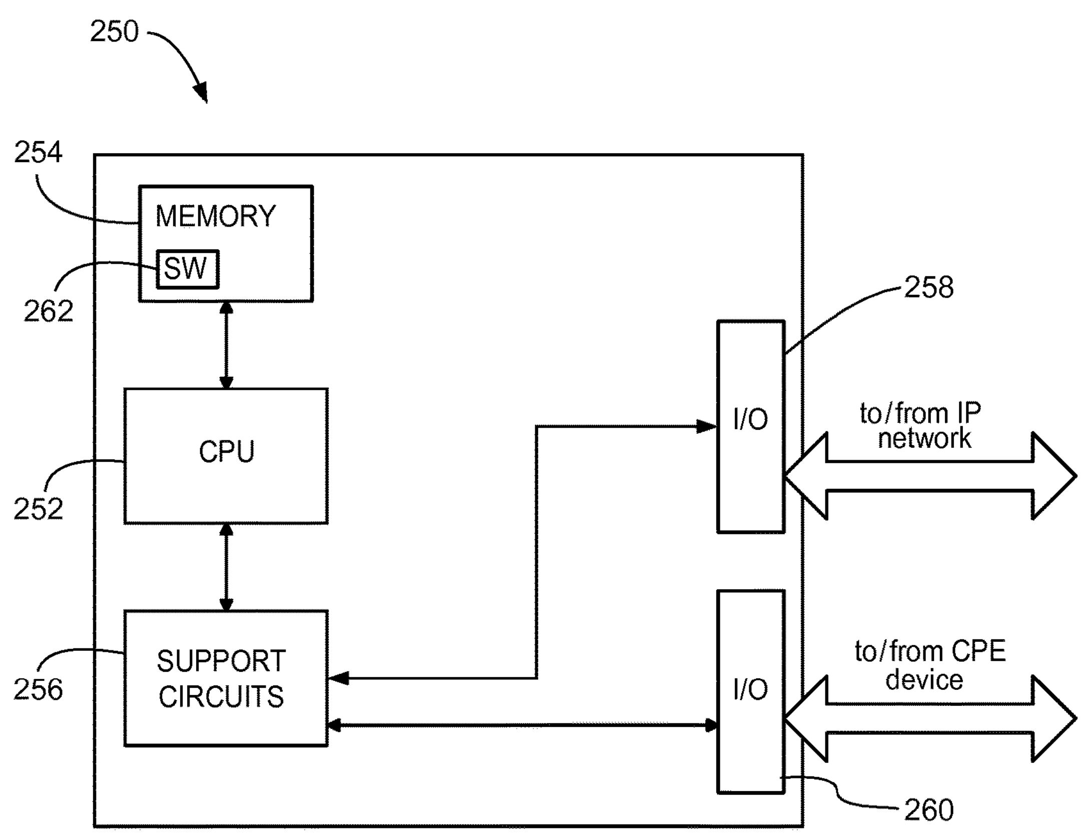
FIG. 2 is a diagram of various elements of a processor that forms part of an IP telephony system or an IP telephony device.

FIG. 2 illustrates elements of a computer processor 250 that can be used as part of the first or second IP telephony systems 120, 170 to accomplish various functions. Each of the IP telephony systems 120, 170 could include multiple processors 250 located at various locations in the system, along with their operating components and programming, each carrying out a specific or dedicated portion of the functions performed by the IP telephony systems 120, 170.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to conduct a unidirectional or bidirectional transaction. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephone communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
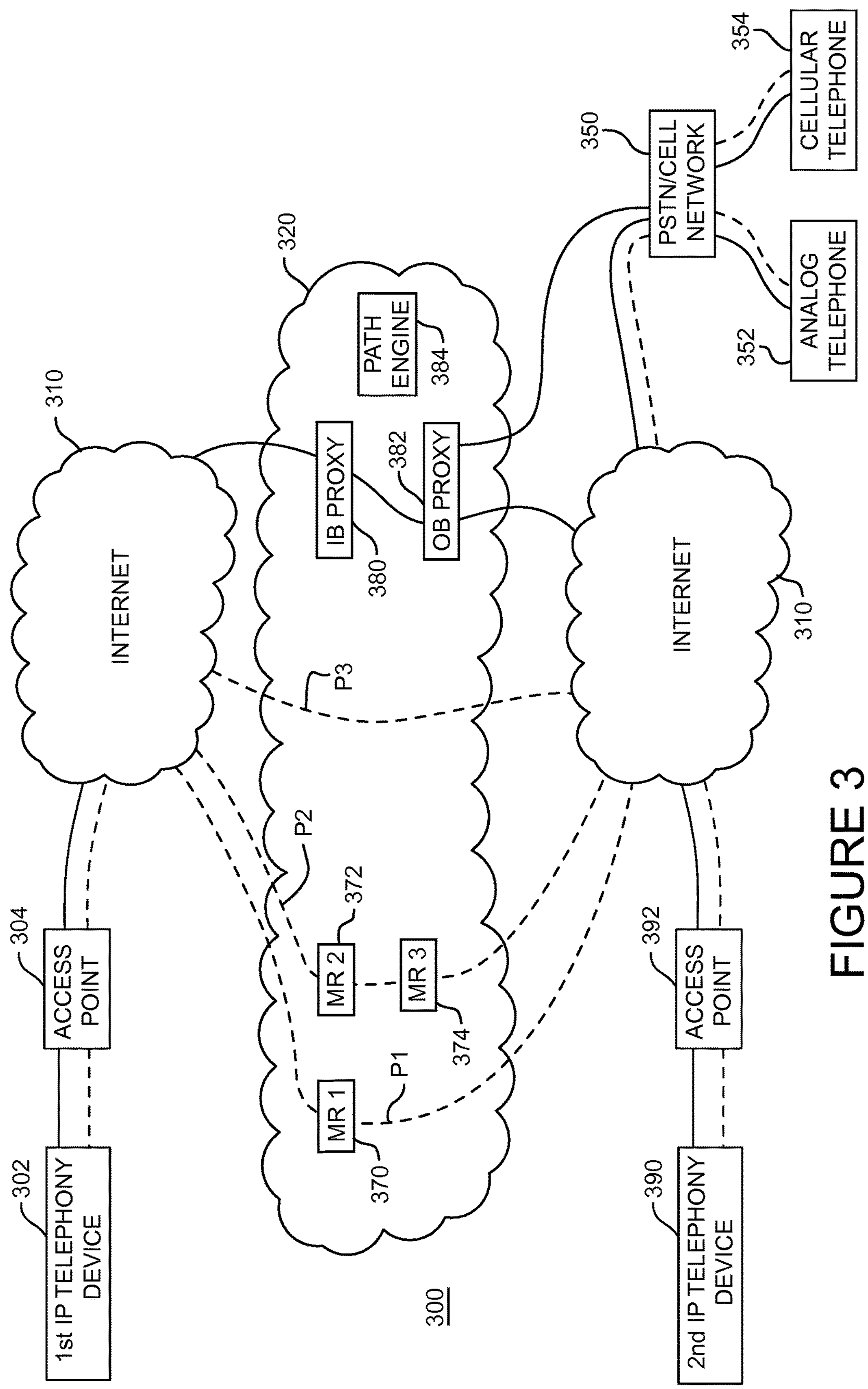
FIG. 3 is a diagram illustrating the paths traversed by data packets bearing setup signaling and the media of IP telephony communications.

FIG. 3 illustrates elements of a communications environment 300 which enables an IP telephony device to communicate with another IP telephony device, or an analog or cellular telephone that is reachable via a PSTN or cellular telephony service provider. Before describing how systems and methods embodying the invention operate, we will first review how a telephony communication with an IP telephony device is established and conducted, with reference to the diagram in FIG. 3.

In FIG. 3, solid lines extending between the elements represent the paths traversed by setup signaling. Dashed lines that extend between the elements represent the paths traversed by data packets bearing the media of an IP telephony communication.

When a first IP telephony device 302 wishes to establish a IP telephony communication with a second IP telephony device 390, the first IP telephony device 302 sends a setup request to an inbound proxy server 380 of an IP telephony system 320 via an access point 304 and the Internet 310. The access point 304 could be a wireless access point, or some other interface device which connects the first IP telephony device 302 to the Internet 310.

The inbound proxy server 380 uses information in the setup request to determine that the first IP telephony device 302 is attempting to setup an IP telephony communication with the second IP telephony device 390, and the inbound proxy server 380 identifies an outbound proxy server 382 that is capable of communicating with the second IP telephony device 390. The inbound proxy server 380 may consult a path engine 384 of the IP telephony system 320 to learn the identity of the outbound proxy server 382.

The inbound proxy server 380 then forwards the setup request to the outbound proxy server 382, and the outbound proxy server 382 sends the setup request on to the second IP telephony device 390 via the Internet 310 and the access point 392. If the second IP telephony device 390 is available for the communication, a suitable response is sent back to the first IP telephony device via the access point 392, Internet 310 and the IP telephony system 320. A path is selected for the data packets which will carry the media of the IP telephony communication, and both the first and second IP telephony devices 302, 390 are informed of the path. The first and second IP telephony devices 302, 390 then begin generating streams of data packets bearing the media of the IP telephony communication, and the streams are sent over the selected path.

FIG. 3 illustrates that at least three paths P1, P2 and P3 are available for transmission of the data packets bearing the media of the IP telephony communication. The first path P1 extends through a first media relay 370. The second path P2 extends through both a second media relay 372 and a third media relay 374. The third path P3 runs directly between the first IP telephony device 302 and the second IP telephony device 390. One of these paths would be selected during the setup process.

FIG. 3 also illustrates that the first IP telephony device 302 could also establish a telephony communication with an analog telephone 352 or a cellular telephone 354 that are reachable via a PSTN/Cellular Network 350. The setup and conduct of the call would proceed essentially as described above. However, the outbound proxy server 382 may convert the setup request into a different format before passing the setup request on to the PSTN/Cellular Network 350. Also, the media of the IP telephony communication may be converted into a different form by the element of the IP telephony system 320 which is in direct communication with the PSTN/Cellular network 350. For example, the first media relay 370 or the third media relay 374 may convert data packets bearing the media of the telephony communication before sending the media on to the PSTN/Cellular Network 350. Likewise, the element of the IP telephony system 320 in communication with the PSTN/Cellular Network 350 may convert media received from the PSTN/Cellular Network 350 into standard IP data packets bearing the media, which are then sent on to the first IP telephony device 302. Alternatively, an element of the PSTN/Cellular Network may convert the setup request and/or the media of the telephony communication after receiving same from an element of the IP telephony system 320.

As explained above in the background section of the application, the data packets bearing the media of the IP telephony communication are carried over the Internet 310 as they traverse a path between the first IP telephony device 302 and the second IP telephony device 390. One or more Internet Service Providers (ISPs) will likely be responsible for conveying the data packets over at least a part of that journey. As also explained above, the ISPs may attempt to identify the data packets as carrying the media of an IP telephony communication. And if the ISPs believe that a stream of data packets is carrying an IP telephony communication, the ISPs may throttle the transmission of those data packets.

One way that an ISP can attempt to identify a stream of data packets as carrying an IP telephony communication is by inspecting the contents of the data packets. Basically, the ISP compares data in the data packets to known standards for data packets that typically carry the media of IP telephony communications to determine whether the data packets appear to conform to such a standard. In particular, the data in a header of a data packet is typically examined in this fashion. If the data appears to conform to a standard used for IP telephony communications, the ISP may throttle transmission of the data packets, or discard the data packets completely.

Figure 4:
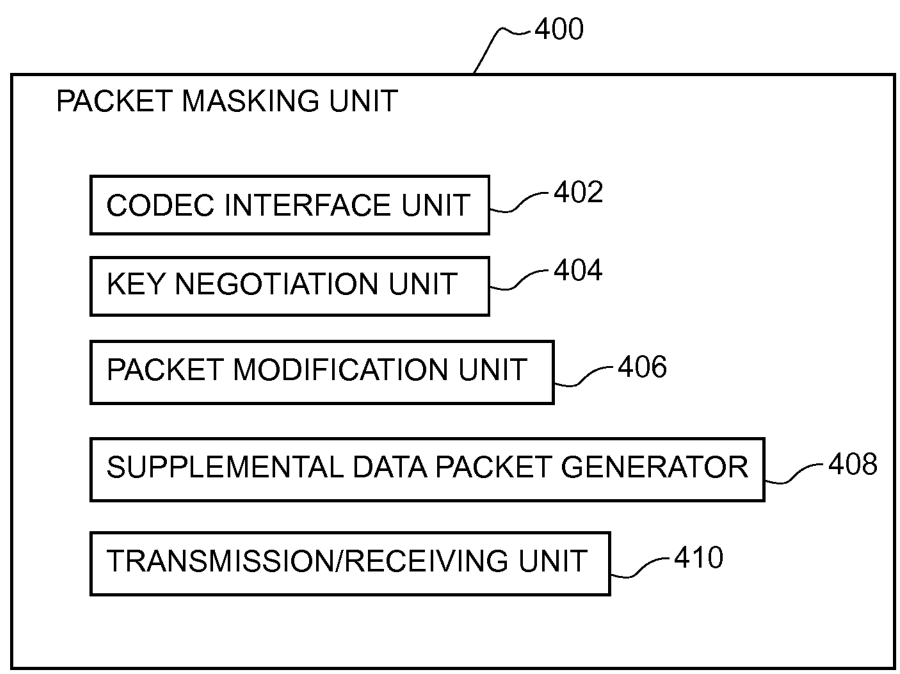
FIG. 4 is a block diagram of a data packet masking unit which can be part of an IP telephony device or an element of an IP telephony system.

FIG. 4 illustrates elements of a packet masking unit 400 which could be a part of an IP telephony device, or an element of an IP telephony system, such as a media relay or a gateway. The packet masking unit 400 selectively alters the data in outgoing data packets bearing the media of an IP telephony communication to prevent an ISP from identifying the data packet as carrying the media of an IP telephony communication. The packet masking unit 400 may also receive incoming data packets bearing the media of an IP telephony communication which have been selectively altered, and operate to correct the data in the received data packets so that they resume their original form.

The packet masking unit 400 includes a CODEC interface unit 402, a key negotiation unit 404, a packet modification unit 406, a supplemental data packet generator 408 and a transmission/receiving unit 410. The functions of these elements are explained below.

The method illustrated in FIG. 5, as well as several other methods which are described below, assume that during setup of an IP telephony communication, a key is established for the telephony communication. The key is used to selectively modify either the data packets bearing the media of the IP telephony communication, or a stream of data packets bearing the media of an IP telephony communication.

The key can be provided by an element of an IP telephony system that participates in setting up the IP telephony communication, such as an inbound proxy server 380, an outbound proxy server 382 or a path engine 384. The key is provided to the IP telephony devices that are to conduct the IP telephony communication. As will also be explained below, the key may also be provided to one or more elements that are responsible for conveying the data packets bearing the media of the IP telephony communication, such as a media relay or gateway.

In some instances, one of the IP telephony devices or an element responsible for conveying the data packets bearing the media of an IP telephony communication will generate the key. In other embodiments, the key may be established via a negotiation that occurs between the IP telephony devices and/or the elements that are responsible for helping to transmit the data packets.

The key can be a sequence of numbers, letters or other symbols which is used to selectively modify the data packets, or a stream of data packets, bearing the media of an IP telephony communication. The key is also used to correct the data packets or the stream of data packets so that they are returned to their original form.

A key may remain static over the duration of a communication session. However, in some embodiments the key may change over time. For example, there are known methods of operating with a “rotating” key which changes according to a predetermined method. In such embodiments, the initial key would be established, and thereafter the key would change according to an agreed upon modification method. The modifications could occur at predetermined periods of time, after the transmission or reception of a predetermined number of data packets, or according to other modification methods.

In instances where a key is to vary over time, the variation could be based on a linear number series, or a linear number series that is based on the day of the week, or the day of the month. Any sort of time varying pattern could be established and used.

The key which is used by both a transmitting telephony device and a receiving telephony device could be obtained by hashing a particular character string that is known to both telephony devices. For example, one could hash the IP address of one of the telephony devices to obtain a key.

Figure 5:
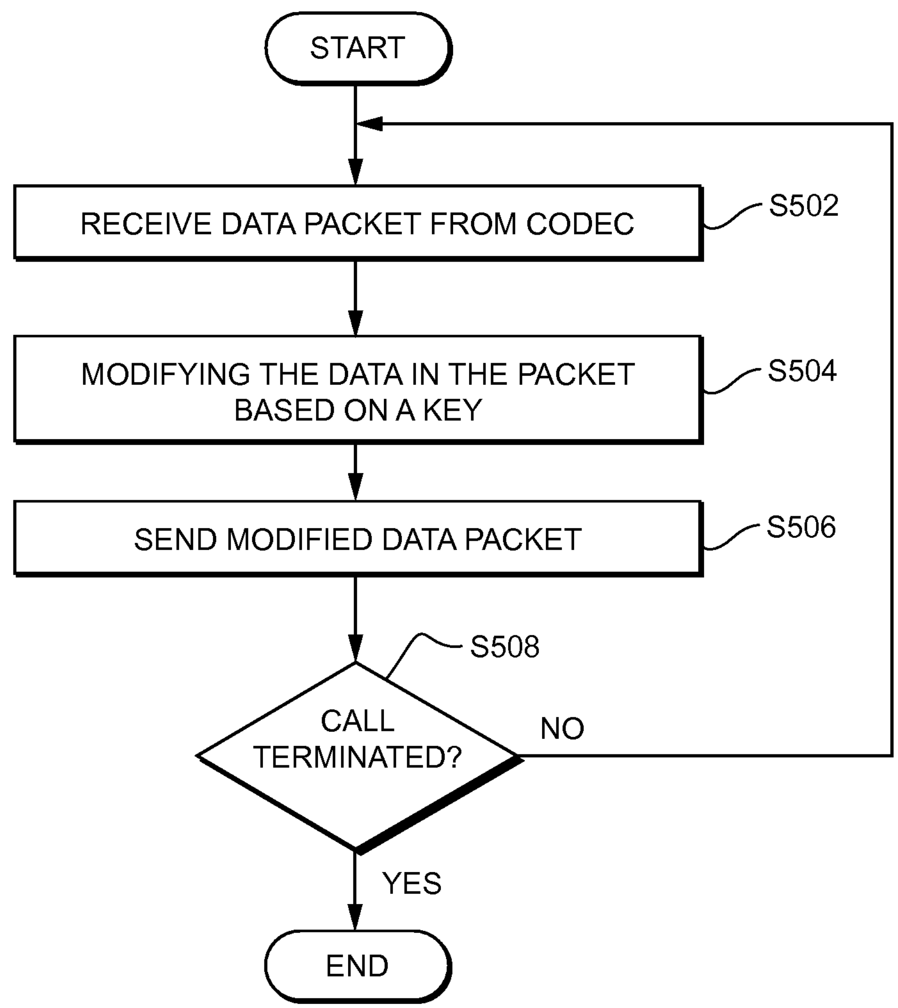
FIG. 5 is a flowchart illustrating steps of a method that would be performed by an IP telephony device or an element of an IP telephony system to mask information contained in data packets bearing the media of an IP telephony communication.

FIG. 5 illustrates steps of a method that would be performed by a packet masking unit 400 of an IP telephony device to selectively modify outgoing data packets being generated by the IP telephony device to thereby prevent an ISP from identifying the data packets as carrying an IP telephony communication. The selective modification of the data packets is performed using a key, as discussed above. The key would have been received by the key negotiation unit 404 of the packet masking unit 400 of the IP telephony device during setup of the IP telephony communication.

The method begins and proceeds to step S502 where a first data packet is received from a CODEC of an IP telephony device, or possibly from a data buffer that has been filled with data packets by the CODEC. This step is performed by the CODEC interface unit 402 of the packet masking unit 400 illustrated in FIG. 4. The CODEC of a first IP telephony device which is in communication with a second IP telephony device converts audio information into a stream of digital data packets which are then transmitted to the second IP telephony device. A CODEC in the second IP telephony device uses the received stream of data packets to generate audio that is then played to the user of the second IP telephony device.

In step S504, a packet modification unit 406 of the packet masking unit 400 selectively modifies data in the received data packet based on the key. In step S506, the transmission/receiving unit 410 sends the modified data packet out. This could include passing the modified data packet to a physical transmission unit of the IP telephony device so that it can be sent to the other IP telephony device participating in the IP telephony communication.

In step S508, a determination is made as to whether the IP telephony communication has been terminated. Is so, the method ends. If not, the method loops back to step S502, and another data packet is received from the CODEC of the IP telephony device. The received data packet is then modified and sent as described above. This process repeats until the IP telephony communication is terminated. As a result, each of the data packets being generated and sent is selectively modified. And the modification of the data packets is designed to prevent an ISP from identifying the data packets as confirming to a typical standard used to convey IP telephony communications.

In some embodiments, the same basic modification may be made to each of the data packets. In alternate embodiments, different types of modifications may be made to different data packets. The modifications are based on the key which has been established for the IP telephony communication.

In some embodiments, the key that is used to modify data packets and to return the modified data packets to their original condition could remain the same for the entire duration of a telephony communication. In alternate embodiments, the key could change one or more times during the duration of a telephony communication.

In some embodiments, the data in the header of the data packet is modified based on the key. In other embodiments, data in the body or payload of the data packet may be modified based on the key. In still other embodiments, data in both the header and payload sections of the data packet may be modified.

The modifications to the data may include transposing certain data values based on the key. Alternatively, the start position of data in the data packet could be selectively modified based on the key. In still other instances, the positions of certain data could be selectively modified based on the key. Virtually any type of modification to the data in the data packet which would help to prevent the data from conforming to a standard used for IP telephony communications could be performed.

Figure 6:
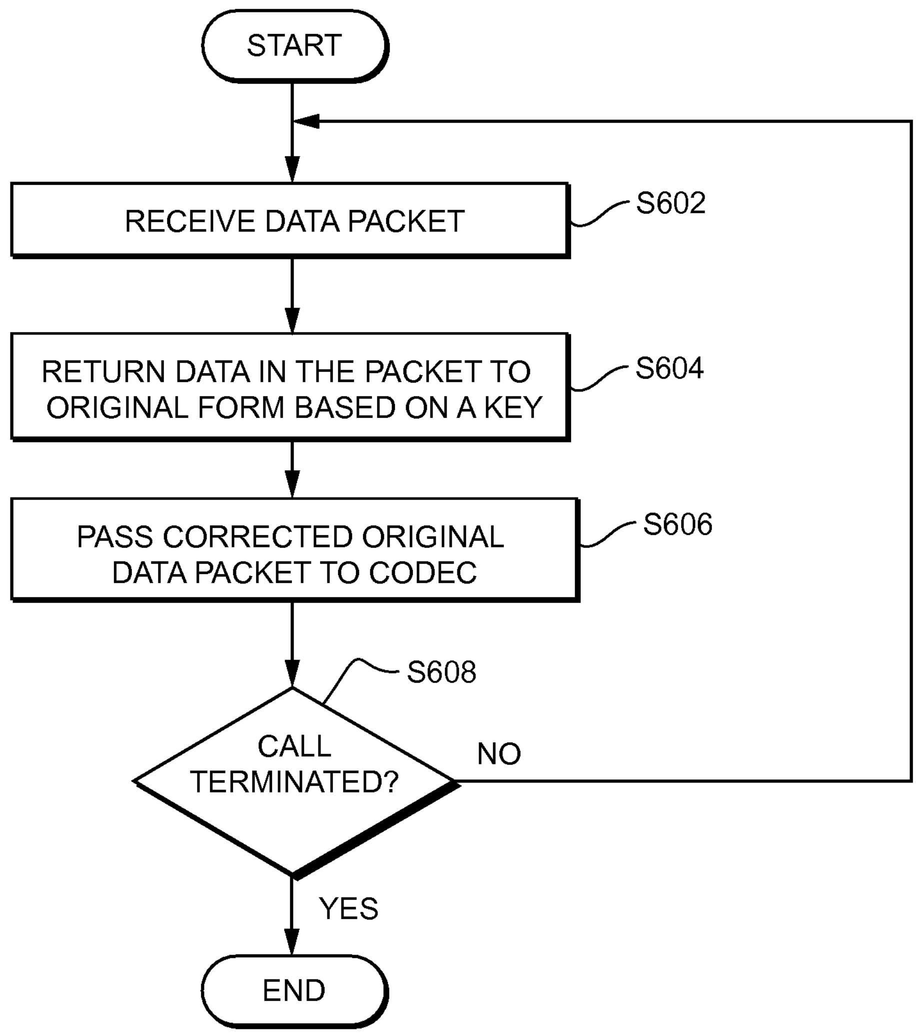
FIG. 6 is a flowchart illustrating steps of a method that would be performed by an IP telephony device or an element of an IP telephony system to convert masked information contained in data packets bearing the media of an IP telephony communication back into normal data.

The method illustrated in FIG. 5 and described above is performed by a first IP telephony device that is generating data packets bearing the audio of an IP telephony communication. In many instances, those data packets are then sent to a second IP telephony device which uses the data packets to generate audio. FIG. 6 illustrates steps of a method which is performed by the second IP telephony device to return the data in the modified data packets back into its original form so that the data packets can be used to generate appropriate audio.

The method begins and proceeds to step S602, where the transmission/receiving unit 410 of a packet masking unit 400 of the second IP telephony device receives an incoming data packet. As explained above, the data packet will have been modified by the packet masking unit 400 of the first IP telephony device based on a key that has been established for the IP telephony communication.

The method proceeds to step S604 where the packet modification unit 406 of the packet masking unit 400 of the second IP telephony device returns the data in the received data packet to its original form using the same key. The CODEC interface unit 402 then passes the original data packet on to the CODEC on the second IP telephony device so that it can be used to generate audio.

In step S608 a check is performed to determine if the IP telephony communication has been terminated. If so, the method ends. If not, the method loops back to step S602 and the next incoming data packet is received. The next data packet is then returned to its original form and sent on to the CODEC, as explained above. This process continues for the duration of the IP telephony communication.

Those of ordinary skill in the art will appreciate that the packet masking unit 400 in each of the first and second IP telephony devices that are a party to an IP telephony communication will be performing both the method illustrated in FIG. 5 to selectively modify outgoing data packets, as well as the method illustrated in FIG. 6, to return the data in incoming modified data packets back into their original form.

As explained above with reference to FIG. 3, in some instances, a first IP telephony device 302 may enter into a communication with an analog telephone 352 or a cellular telephone 354 that is reachable via a PSTN/Cellular Network 350. In this instance, data packets being generated by and received by the first IP telephony device 302 will still be traversing the Internet 310, and thus will still be subject to throttling by an ISP. Thus, it is still desirable to modify the data packets to prevent or disrupt inspection efforts by an ISP. However, clean, un-modified data packets must be provided to an interface device that communicates with the PSTN/Cellular Network 350, because this type of communication will not include a second IP telephony device capable of correcting the modified data packets.

Under these circumstances, a packet masking unit 400 is installed and used by the interface device that is in communication with the PSTN/Cellular Network 350. For example, the first media relay 370 and/or the third media relay 374 could include a packet masking unit 400 which receives the key established for the IP telephony communication. The packet masking unit 400 on the interface device would then perform the method illustrated in FIG. 6 to return received modified data packets back into their original form before the data packets are passed along to the PSTN/Cellular Network 350. In some embodiments, the corrected, original data packets would be used by the interface device to generate an audio signal that is passed on to the PSTN/Cellular Network 350. The packet masking unit 400 on the interface device would also be responsible for performing the method illustrated in FIG. 5, to selectively modify the data packets that are being generated and sent to the first IP telephony device 302 based on the key established for the IP telephony communication.

In the methods described above, the data within a data packet is modified to prevent the data from conforming to a standard used for IP telephony communications. In alternate methods, which are described below, the sizes of the data packets bearing the media of an IP telephony communication are selectively modified to prevent the size of the data packets from conforming to a known standard. These methods could be used alone, or in combination with the methods described above.

Figure 7:
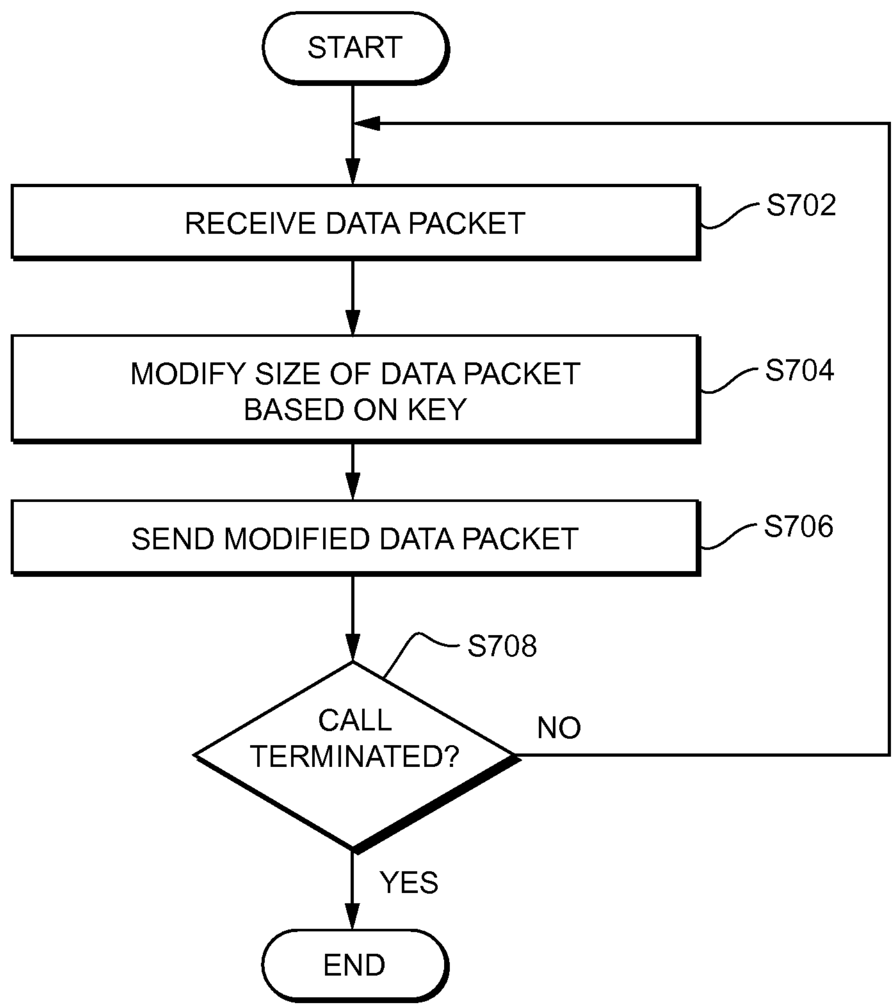
FIG. 7 is a flowchart illustrating steps of a method that would be performed by an IP telephony device or an element of an IP telephony system to modify the size of data packets bearing the media of an IP telephony communication.

The method illustrated in FIG. 7 would be performed by elements of a packet masking unit 400, as illustrated in FIG. 4. As explained, the packet masking unit 400 would be running on an IP telephony device, or possibly an element of an IP telephony system.

The method would begin and proceed to step S702 where one or more data packets are received by the CODEC interface unit 402 from a CODEC of the IP telephony device. The packet modification unit 406 then modifies a size of a data packet based on the key that has been established for the IP telephony communication.

The step of modifying a size of a data packet could include starting with a first plurality of data packets and then moving the data from the first number of data packets into a greater number of smaller data packets. No data would be lost, but the end result would be data packets that are smaller than typical data packets used to convey the media of an IP telephony communication.

The step of modifying a size of a data packet could also include increasing the size of one or more data packets. In some embodiments, this could simply involve adding meaningless data to the data that was originally present to create larger data packets. In some instances, this could also include taking the data from several data packets and re-formatting the data into a lesser number of larger data packets.

In some embodiments, the key used to modify the size of the data packets could specify that some data packets in a stream generated by a CODEC are to be made smaller and that other data packets in the stream are to be made larger. The end result could be a stream of data packets of varying sizes. This could involve moving the data from data packets that are made smaller into the data packets that are made larger. By ensuring that the size of the data packets varies, one can prevent an ISP from identifying the data packets as belonging to a stream of data packets that carries an IP telephony communication, because such data packets are typically always substantially the same size.

The method then proceeds to step S706, where a data packet produced in step S704 is sent on. This could include passing the modified data packet on to a transmission unit of the IP telephony device. In step S708, a check is made to determine if the IP telephony communication has terminated. If so, the method ends. If not, the method loops back to step S702, where more data packets are received, modified and passed on. These steps continue to repeat until the IP telephony communication terminates.

Figure 8:
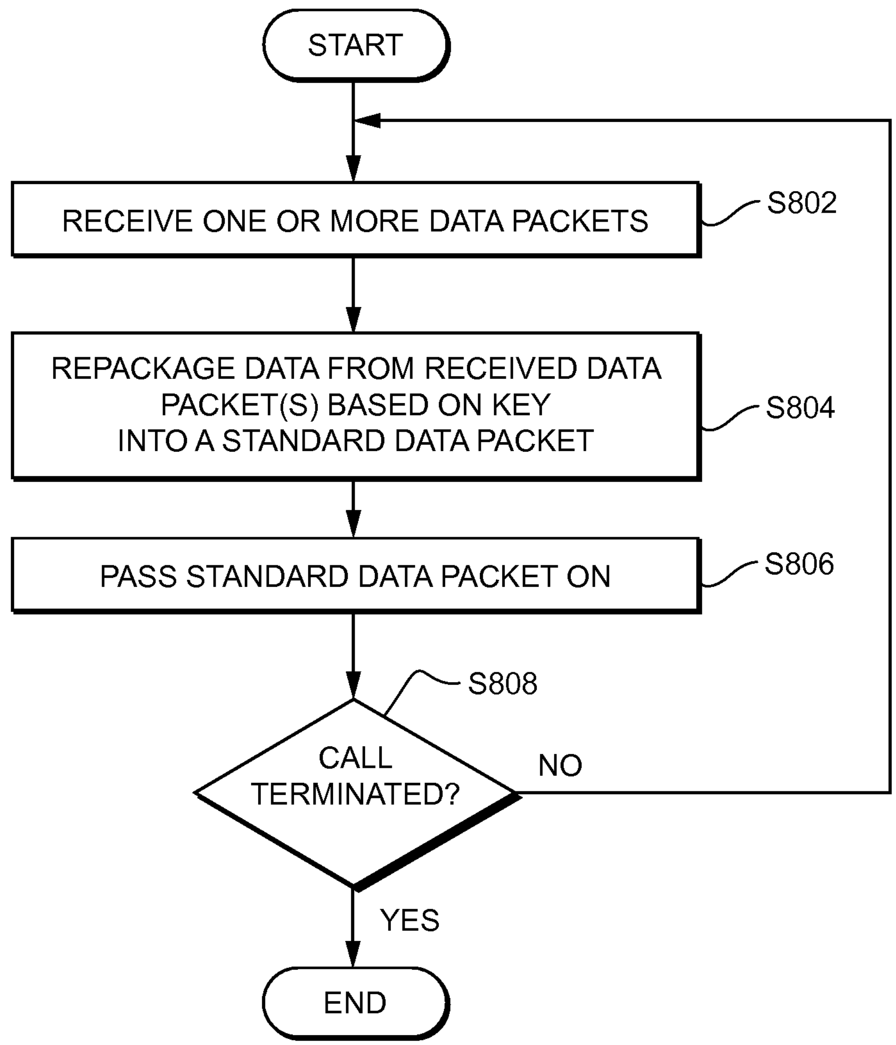
FIG. 8 is a flowchart illustrating steps of a method that would be performed by an IP telephony device or an element of an IP telephony system to re-package data in modified data packets bearing the media of an IP telephony communication back into standard sized data packets.

FIG. 8 illustrates steps of a corresponding method that would also be performed by a packet masking unit 400 of an IP telephony device that is receiving a stream of data packets that were modified according to a method as illustrated in FIG. 7. The method would begin and proceed to step S802 where the transmission receiving unit 410 receives one or more modified data packets. In step S804, the packet modification unit 406 repackages the data in the received data packets into data packets having a standard size and format. The re-packaging of the data would be based on the key that has been established for the IP telephony communication. Then, in step S806, the re-packaged (now standard data packets) are passed on to a CODEC of the IP telephony device by the CODEC interface unit 402. The CODEC uses the data packets to generate audio.

In step S808, a check is performed to determine if the IP telephony communication has terminated. If so, the method ends. If not, the method loops back to step S802, and more data packets are received, re-packaged and passed to the CODEC. These steps continue until the IP telephony communication terminates.

The methods discussed above result in individual data packets being modified so that they do not resemble data packets that conform to a standard used for IP telephony communications. However, as noted above, an ISP may also pay attention to the overall data transfer rate of a stream of data packets to determine if the data transfer rate conforms to a standard used for IP telephony communications. The masking steps described above may not be successful in hiding this aspect.

In additional methods described below, the overall data transfer rate of a stream of data packets is modified so that it does not conform to a standard data rate used for IP telephony communications. Because it is generally not desirable to remove data, or compress the data, additional supplemental data packets are added to the stream of data packets produced by a CODEC of an IP telephony device. The result is a stream of data packets having a greater data transfer rate than a standard stream of data packets bearing the media of an IP telephony communication. The methods described below can be used separately, or in combination with the methods described above.

Figure 9:
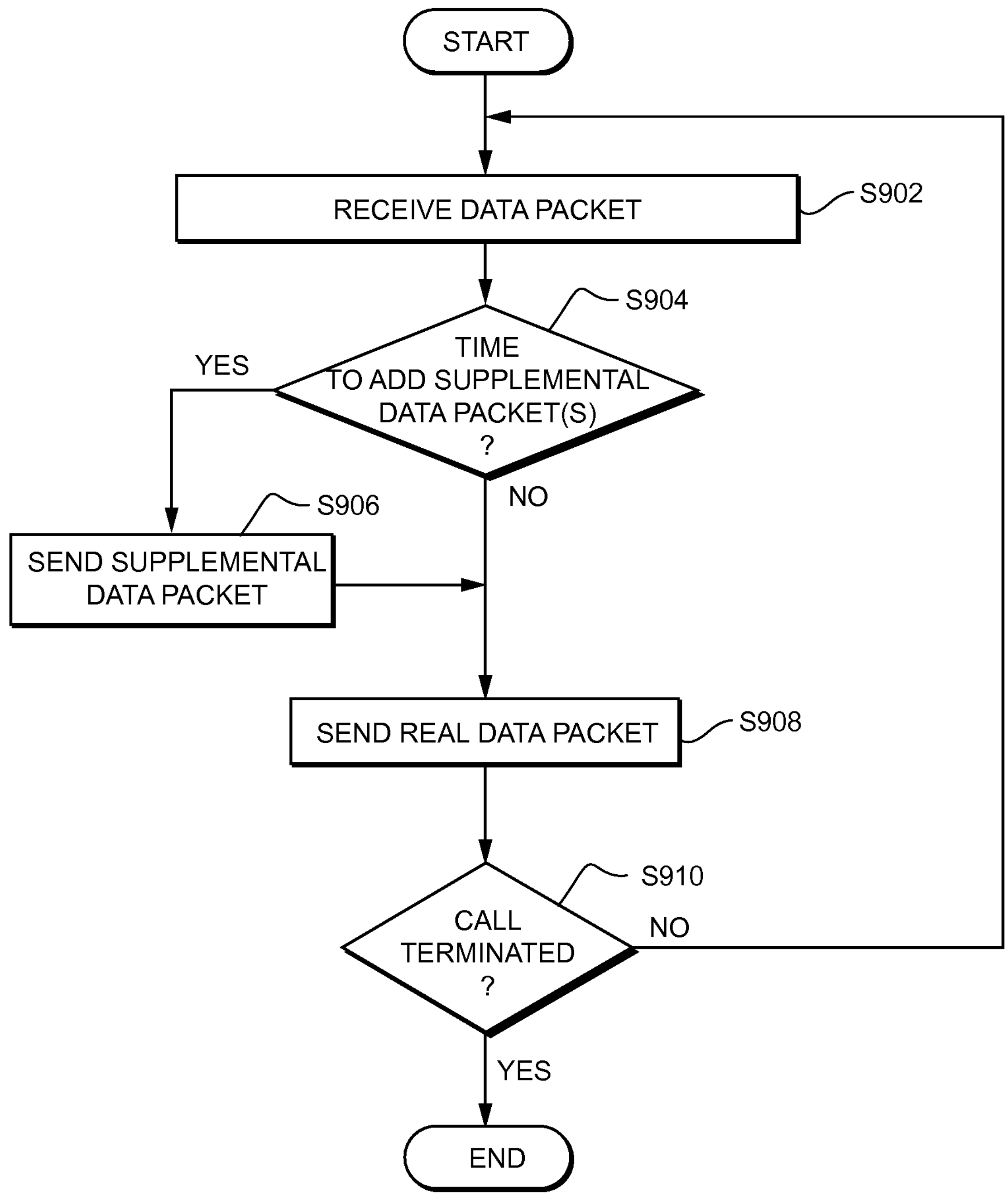
FIG. 9 is a flowchart illustrating steps of a method that would be performed by an IP telephony device or an element of an IP telephony system to insert supplemental data packets into a stream of data packets bearing the media of an IP telephony communication.

FIG. 9 illustrates a method that would be performed by a packet masking unit 400 of an IP telephony device. The method begins and proceeds to step S902, where a data packet is received from CODEC of the IP telephony device by a CODEC interface unit 402. In step S904, a check is made to determine if a supplemental data packet should be added to the stream at this point in time. This check is performed using information in or developed from the key that has been established for the IP telephony communication.

If the check performed in step S904 indicates that a supplemental data packet should be inserted into the stream, then the method proceeds to step S906, where a supplemental data packet generated by the supplemental data packet generator 408 of the packet masking unit 400 is transmitted. The method then proceeds to step S908, where the data packet received in step S902 is transmitted. If the check performed in step S904 indicates that it is not time to send a supplemental data packet, the method proceeds to directly to step S908, where the data packet received in step S902 is sent.

The method then proceeds to step S910, where a check is performed to determine if the IP telephony communication has terminated. If so, the method ends. If not, the method loops back to step S902, where another new data packet is received, and the steps repeat. The steps continue to repeat until the IP telephony communication is terminated.

Figure 10:
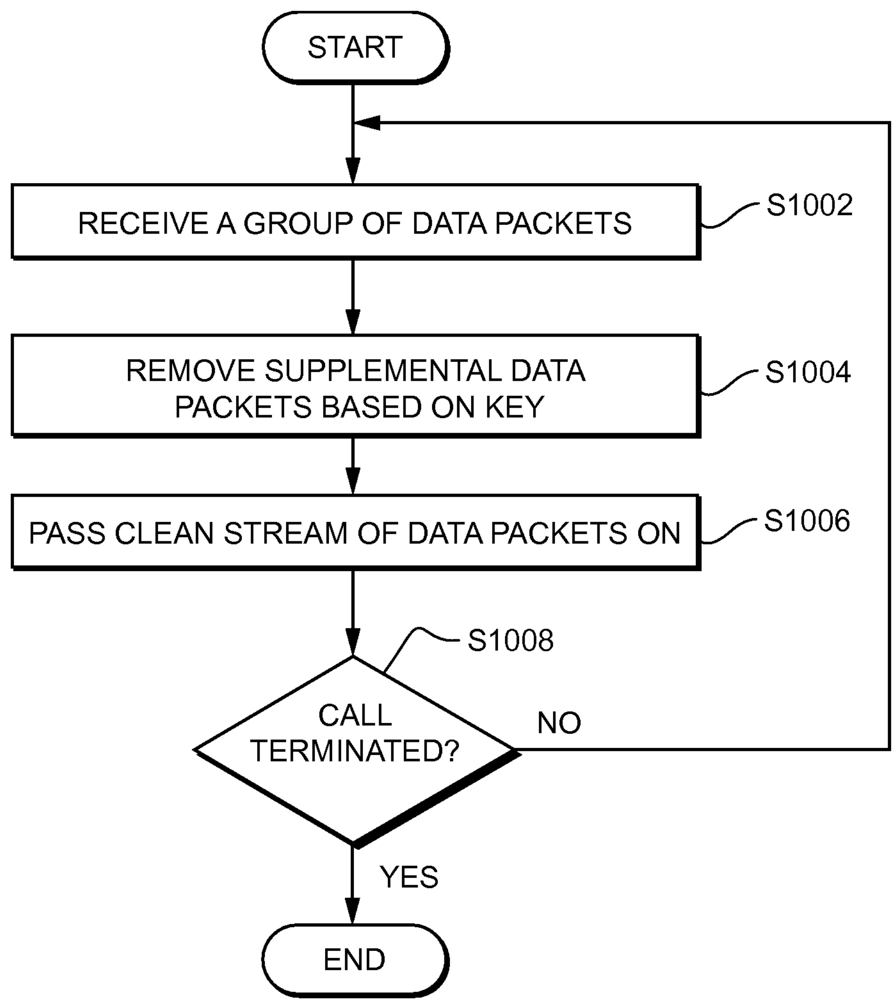
FIG. 10 is a flowchart illustrating steps of a method that would be performed by an IP telephony device or an element of an IP telephony system to remove supplemental data packets from a stream of data packets bearing the media of an IP telephony communication.

FIG. 10 illustrates steps of a corresponding method that is performed by a packet masking unit 400 of a device that receives a modified stream of data packets that include supplemental data packets. The method begins and proceeds to step S1002, where a group of data packets is received by the transmission/receiving unit 410. The method proceeds to step S1004, where any supplemental data packets are removed from the group of data packets received in step S1002. The removal step is performed using data in or generated from the key that has been established for the IP telephony communication. Then, in step S1006, the restored stream of data packets is passed along to a CODEC of the device by the CODEC interface unit 402.

A check is then performed in step S1008 to determine if the IP telephony communication has terminated. If so, the method ends. If not, the method loops back to step S1002, and the steps described above are repeated. The steps continue to repeat until the IP telephony communication is terminated.

In several of the methods described above, references are made to receiving one or more data packets from a CODEC, and to passing one or more data packets on to a CODEC. When the methods are performed by an IP telephony device, this would occur, although the data packets may be received from or sent to a data buffer that is used by the CODEC. However, when methods as described above are being performed by an element of an IP telephony system, such as a media relay or a gateway, these steps might not involve receiving the data packets from a CODEC or sending the data packets to a CODEC. Instead, those corresponding steps may involve receiving the data packets from or sending the data packets to an IP telephony device, another element of an IP telephony system, or a gateway that acts as an interface to a PSTN, a Cellular Network, or another IP telephony system.

In many of the foregoing descriptions, a software application running on a telephony device performs various functions. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

In the embodiments discussed above, a first IP telephony device is seeking to setup a telephony communication with a second IP telephony device. However, the systems and methods described above are equally applicable to situations where a first IP telephony device is attempting to setup a telephony communication with an analog or cellular telephone. In those instances, the first IP telephony device would be sending data packets bearing the media of the telephony communication to a gateway or another similar device which acts as an interface between an IP telephony system and the PSTN or a cellular network. However, the media relays discussed above could still be used to communicate data packets bearing the media of the telephony communication between the interface gateway and the first IP telephony device. Thus, most of the methods described above could also be used to facilitate the selection and use of particular communication paths in this situation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of modifying the size of one or more data packets bearing the media of an IP telephony communication, comprising receiving one or more data packets bearing the media of an IP telephony communication, the one or more data packets conforming to a standard used for IP telephony communications; and modifying a size of at least one of the received data packets based on a key that has been established for the IP telephony communication in such a manner that a modified data packet does not resemble data packets that conform to the standard used for IP telephony communications wherein the modifying step comprises modifying the sizes of a plurality of the received data packets; and, wherein the modifying step comprises modifying the size of a first of the received data packets in a first way, and modifying the size of a second of the received data packets in a second way that is different from the first way.

2. The method of claim 1, further comprising receiving the key during setup of the telephony communication.

3. The method of claim 1, further comprising negotiating the key during setup of the telephony communication, wherein the negotiation is performed with at least one of an IP telephony device and an element of an IP telephony system.

4. The method of claim 1, wherein the modifying step comprises adding random data to at least one of the received data packets to increase the size of the at least one data packet.

5. A method of modifying the size of one or more data packets bearing the media of an IP telephony communication, comprising receiving one or more data packets bearing the media of an IP telephony communication, the one or more data packets conforming to a standard used for IP telephony communications; and modifying a size of at least one of the received data packets based on a key that has been established for the IP telephony communication in such a manner that a modified data packet does not resemble data packets that conform to the standard used for IP telephony communications, wherein the modifying step comprises removing a portion of the data contained in a first of the received data packets to reduce a size of the first data packet, and adding the removed data to a second of the received data packets to increase a size of the second data packet.

6. A system for modifying the size of one or more data packets bearing the media of an IP telephony communication, comprising a receiving unit that receives one or more data packets bearing the media of an IP telephony communication, the one or more data packets conforming to a standard used for IP telephony communications;

a processor configured to modify a size of at least one of the received data packets based on a key that has been established for the IP telephony communication in such a manner that a modified data packet does not resemble data packets that conform to the standard used for IP telephony communications, wherein the processor is configured to modify the size of a first of the received data packets in a first way, and modifies the size of a second of the received data packets in a second way that is different from the first way.

7. The system of claim 6, wherein the processor is further configured to negotiate the key during setup of the telephony communication, wherein the negotiation is performed with at least one of an IP telephony device and an element of an IP telephony system.

8. The system of claim 6, wherein the processor is configured to add random data to at least one of the received data packets to increase the size of the at least one data packet.

9. A system for modifying the size of one or more data packets bearing the media of an IP telephony communication, comprising a receiving unit that receives one or more data packets bearing the media of an IP telephony communication, the one or more data packets conforming to a standard used for IP telephony communications;

a processor configured to modify a size of at least one of the received data packets based on a key that has been established for the IP telephony communication in such a manner that a modified data packet does not resemble data packets that conform to the standard used for IP telephony communications wherein the processor is configured to remove a portion of the data contained in a first of the received data packets to reduce a size of the first data packet, and to add the removed data to a second of the received data packets to increase a size of the second data packet.

10. A method of correcting the size of one or more data packets bearing the media of an IP telephony communication, comprising receiving one or more data packets bearing the media of an IP telephony communication, wherein the size of the one or more data packets has been altered based on a key that has been established for the IP telephony communication in such a manner that an altered data packet does not resemble data packets that conform to a standard used for IP telephony communications; and correcting the size of the received data packets based on the key so that corrected data packets conform to a standard used for IP telephony communications;

wherein the correcting step comprises correcting the sizes of a plurality of the received data packets; and wherein the correcting step comprises modifying the size of a first of the received data packets in a first way, and modifying the size of a second of the received data packets in a second way that is different from the first way.

11. The method of claim 10, further comprising receiving the key during setup of the telephony communication.

12. The method of claim 10, further comprising negotiating the key during setup of the telephony communication, wherein the negotiation is performed with at least one of an IP telephony device and an element of an IP telephony system.

13. The method of claim 10, wherein the correcting step comprises removing random data that has been inserted into at least one of the received data packets from the at least one data packet to decrease the size of the at least one data packet.

14. A method of correcting the size of one or more data packets bearing the media of an IP telephony communication, comprising receiving one or more data packets bearing the media of an IP telephony communication, wherein the size of the one or more data packets has been altered based on a key that has been established for the IP telephony communication in such a manner that an altered data packet does not resemble data packets that conform to a standard used for IP telephony communications; and correcting the size of the received data packets based on the key so that corrected data packets conform to a standard used for IP telephony communications;

wherein the correcting step comprises removing a portion of the data contained in a first of the received data packets to reduce a size of the first data packet, and adding the removed data to a second of the received data packets to increase a size of the second data packet.

15. A system for correcting the size of one or more data packets bearing the media of an IP telephony communication, comprising a receiving unit that receives one or more data packets bearing the media of an IP telephony communication, wherein the size of the one or more data packets has been altered based on a key that has been established for the IP telephony communication in such a manner that an altered data packet does not resemble data packets that conform to a standard used for IP telephony communications; and a processor that corrects the size of the received data packets based on the key so that corrected data packets conform to a standard used for IP telephony communications;

wherein the processor is configured to remove a portion of the data contained in a first of the received data packets to reduce a size of the first data packet, and to add the removed data to a second of the received data packets to increase a size of the second data packet.

16. The system of claim 15, wherein the processor is configured to remove random data that has been inserted into at least one of the received data packets from the at least one data packet to decrease the size of the at least one data packet.

* * * * *